Patented Dec. 26, 1950

2,535,089

UNITED STATES PATENT OFFICE 2,535,089

INSECT REPELLENTS

Melvin S. Newman, Columbus, Ohio, and Barney J. Magerlein, Kalamazoo, Mich., assignors to the United States of America as represented by the Secretary of the Army No Drawing. Application December 29, 1948,
Serial No. 68,044

7 Claims. (Cl. 167—33)

This invention relates to insect repellents.

We have found that the application of the allyl ester of alpha-methyl-epoxy-cyclohexylidene-acetic acid to the human skin or to a fabric affords effective protection against insect bites, by repelling insects, particularly Aëdes aegypti.

A number of tests to measure the repellency of the allyl ester of alpha-methyl-epoxy-cyclohexylidene-acetic acid against Aëdes aegypti was conducted by smearing the compound on the arms of test personnel, who then thrust their arms into cages containing Aëdes aegypti. The arms were exposed for 30-minute intervals at 3 minutes each until the first insect bite.

Tests to measure the repellency of the allyl ester of alpha-methyl-epoxy-cyclohexylidene-acetic acid impregnated fabrics against Aëdes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aëdes aegypti for 1 to 2 minutes. If no bites or less than 5 bites were received, the tests were repeated each successive day until 5 or more bites during one exposure were received.

It was found that the application of the allyl ester of alpha-methyl-epoxy-cyclohexylidene-acetic acid affords protection against Aëdes aegypti for an average of 257 minutes. Against Anopheles quadrimaculatus, an average repellency time of 126 minutes was noted in analogous tests.

It was found that fabric impregnated with the allyl ester of alpha-methyl-epoxy-cyclohexylidene-acetic acid remained repellent to Aëdes aegypti for over 10 successive days.

For application to the skin, the allyl ester of alpha-methyl-epoxy-cyclohexylidene-acetic acid should be diluted, preferably by dissolving it in dimethyl phthalate (strength of solution on the order of 20%); this solution may in turn be incorporated in a suitable inert liquid or solid carrier such as mineral oil, alcohol, petrolatum, etc. For ease and uniformity of application to the fabric, the allyl ester of alpha-methyl-epoxy-cyclohexylidene-acetic acid may be applied to the fabric in an inert solvent, such as alcohol, ether, etc.

The structural formula of the allyl ester of alpha-methyl-epoxy-cyclohexylidene-acetic acid is

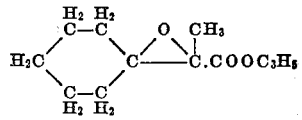

Having thus described our invention, we claim:

1. An insect-repellent fabric comprising fabric impregnated with the allyl ester of alpha-methyl-epoxy-cyclohexylidene-acetic acid.

2. An insect repellent composition comprising a solution of the allyl ester of alpha-methyl-epoxy-cyclohexylidene-acetic acid in dimethyl phthalate.

3. An insect repellent composition comprising the allyl ester of alpha-methyl-epoxy-cyclohexylidene-acetic acid in a non-gaseous inert organic carrier.

4. An insect repellent composition comprising the allyl ester of alpha-methyl-epoxy-cyclohexylidene-acetic acid in alcohol.

5. An insect repellent composition comprising the allyl ester of alpha-methyl-epoxy-cyclohexylidene-acetic acid in petrolatum.

6. A composition for imparting insect repellency to a fabric comprising the allyl ester of alpha-methyl-epoxy-cyclohexylidene-acetic acid in ether.

7. An insect-repellent composition comprising the allyl ester of alpha-methyl-epoxy-cyclohexylidene-acetic acid in mineral oil.

MELVIN S. NEWMAN.
BARNEY J. MAGERLEIN.

REFERENCES CITED

The following references are of record in the file of this patent:

Newman et al., "Some New Compounds as Possible Insect Repellents," Journal Am. Che. Soc., October 1946, pp. 2112–2115; particularly pertinent page 2113, Orlando Code Nos. 7166, 7241, 7202.